United States Patent [19]

Tabuki et al.

[11] Patent Number: 5,653,837
[45] Date of Patent: Aug. 5, 1997

[54] METHOD FOR ADHERING FILM ON SURFACE OF CATHODE-RAY TUBE

[75] Inventors: Yasushi Tabuki; Yoichi Matsubara, both of Kanagawa; Shiro Kenmotsu, Saitama, all of Japan

[73] Assignee: Sony Corporation, Tokyo, Japan

[21] Appl. No.: 451,667

[22] Filed: May 26, 1995

[30] Foreign Application Priority Data

May 31, 1994 [JP] Japan .................................. 6-119137
Sep. 13, 1994 [JP] Japan .................................. 6-219131

[51] Int. Cl.⁶ ............................................... B32B 17/00
[52] U.S. Cl. .......................... 156/99; 156/101; 156/275.5; 156/307.7
[58] Field of Search ....................... 156/101, 99, 275.5, 156/307.7

[56] References Cited

U.S. PATENT DOCUMENTS

| | | | |
|---|---|---|---|
| 4,643,785 | 2/1987 | Paynton | 156/101 |
| 4,656,522 | 4/1987 | Piascinski et al. | 358/247 |
| 5,124,089 | 6/1992 | Ohkoshi et al. | 264/1.4 |

FOREIGN PATENT DOCUMENTS 59-121736  7/1984  Japan.
63-141245  6/1988  Japan.

OTHER PUBLICATIONS

New Riverside University Dictionary, 1984, p. 849.

*Primary Examiner*—Kathleen Choi
*Attorney, Agent, or Firm*—Hill, Steadman and Simpson

[57] ABSTRACT

A method of adhering a film to a panel of a cathode-ray tube, comprised of adhering a light transmitting type functional film to the surface of a panel glass while interposing an ultraviolet ray-curable resin layer therebetween, then bringing the film into tight contact with the panel glass from the inside of one end portion toward that one end portion, then bringing the film into tight contact with the panel glass toward the other end. Further, when bringing the film into tight contact with the panel, by heating by irradiating the front surface of the panel by ultraviolet rays, the resin protruding from the periphery of the film is cured, the work process is shortened, and the handling is facilitated.

11 Claims, 8 Drawing Sheets

METHOD FOR ADHERING FILM ON SURFACE OF CATHODE-RAY TUBE

BACKGROUND OF THE INVENTION

1. Field of the Invention

The present invention relates to a method for adhering a film on the surface of a cathode ray-tube (CRT), more specifically, relates to a method of adhering a functional film on the surface of a cathode ray-tube in by which the film can be adhered well to the surface of the panel glass of the cathode ray-tube.

2. Description of the Related Art

The panel glass of a cathode ray-tube is produced by shaping melted glass by a mold, but unevenness is caused on the surface of the panel glass at the time of shaping, and therefore the surface of the panel glass is polished before use. In the process of production of panel glass, the time and cost taken for polishing the surface of the panel glass and polishing the sealing edge of the panel account for 20 to 30 percent of the cost of the panel. To answer the demand for reduction of the production costs of cathode ray-tubes, it is necessary to streamline the polishing steps.

Also, the increasingly large size of cathode ray-tubes and the flattening of the panel have led to a tendency to make the panel glass thicker so as to achieve the predetermined explosion-prevention performance, but when the panel glass becomes thick, the weight is increased, which is not preferred.

In view of these circumstances, a method in which the thickness per se of the panel glass is kept thin, and the functional glass is bonded to the surface of the panel glass via an adhesive (PPG laminate system) or a method of bonding a transparent functional film to the surface of the panel glass via an adhesive have been proposed.

In the former PPG laminate system, although the finish polishing of the panel glass is eliminated, there are complicated steps of taping etc. The latter method is considered more promising.

Further, in the latter system, there is the effect of protecting the surface of the panel of the cathode ray-tube and prevention of low reflection and static electricity.

In the related art, one of the methods of adhering film in such a cathode-ray tube was to use an adhesion roller.

As shown in FIG. 1A, in this method, first a film 1 to be adhered is sandwiched between a roller 3 of an adhesion roller 2 and a feed roller 4. As shown in FIG. 1B, the adhesion roller 2 is moved downward and the film 1 is pushed against one end portion of the surface of the panel 5. In this case, as the adhesive, for example an ultraviolet ray-curable resin is coated on the entire surface of the panel 5. Then, as shown in FIG. 1C, by rolling the roller 3 in this state and moving the adhesion roller 2 to the other end portion of the surface of the panel 5, the film 1 is brought into tight contact with the surface of the panel 5.

Thereafter, by irradiating the entire surface from the top of the film 1 with ultraviolet rays, the resin between the surface of the panel 5 and the film 1 is cured and therefore the film 1 is bonded to the surface of the panel 5.

However, in this conventional method, the following problem has occurred.

Namely, as shown in FIG. 1B, when the roller 3 is rolled from one end of the surface of the panel 5, normally air bubbles inside the adhesive resin produced near its starting end are pushed out to the terminal end of the surface of the panel 5, but these air bubbles sometimes remain in the resin in the middle of the adhesion process. Such air bubbles become a cause of "glitter" on the effective screen. For this reason, in the past, a method of adhering film with which air bubbles do not remain in the resin of the adhesive has been demanded.

Also, in the method of bonding a functional film to the surface of panel glass via an adhesive, an ultraviolet ray-curable resin is used as the adhesive, however, so there are the following problems.

Namely, there are the problems that the UV resin is cured by the ultraviolet rays, but since the UV resin protruding from the functional film comes into contact with the air, it is difficult to cure, is sticky on the surface, and is apt to catch dirt or dust.

Therefore, development of a UV resin which is sufficiently cured even in the air once irradiated by ultraviolet rays has been demanded, but no UV resin of a low cost having such properties has yet been developed. Also, although increase of the energy output of the UV irradiation, treatment in an oxygen-depleted state, etc. were investigated, the fact is that no definitive means for solving the problem had yet been found.

Moreover, investigation was also made of coating a modified acrylate-based adhesive such as Hardlock (trademark of Denki Kagaku Co.) on the part of the UV resin protruding from the functional film, it cannot be used due to the problem of a yellow discoloration of the resin film, bubbles, etc.

Therefore, in the past, the practice has been to adhere polyester tape or the like on the UV resin protruding from the functional film, but this has the problem that the work is troublesome.

SUMMARY OF THE INVENTION

The first object of the present invention is to provide a method of adhering a film to a surface of a panel of a cathode-ray tube with which air bubbles, which can become the cause of glitter on the effective screen, can be completely pushed out.

The second object of the present invention is to provide a method of producing a cathode ray-tube with which the functional film can be adhered well to the surface of the panel glass of the cathode ray-tube.

To achieve the first object, there is provided a method of adhering a film to a surface of a panel of a cathode-ray tube characterized in that when adhering the film to the surface of the panel of the cathode-ray tube by using an adhesive, the film is brought into tight contact with the panel from the inside of one end portion toward that one end portion, and then the film is brought into tight contact with the panel toward the other end portion.

To achieve the second object, there is provided a method of adhering a film to a surface of a cathode ray-tube which bonds a light transmitting type functional film to the surface of a panel glass, comprising the steps of forming a layer of an ultraviolet ray-curable resin on the surface of the panel glass; adhering a light transmitting type functional film to the ultraviolet ray-curable resin; and heating the ultraviolet ray-curable resin protruding from the periphery of the aforesaid functional film while irradiating ultraviolet rays from the front surface of the functional film.

Further, there is provided a method of producing a cathode ray-tube which bonds a light transmitting type functional film to the surface of a panel glass, comprising the steps of forming a layer of an ultraviolet ray-curable resin on the surface of the panel glass; bringing the film into tight contact with the panel from the inside of one end portion toward that one end portion, and then bringing the film into tight contact with the panel toward the other end portion; and heating the ultraviolet ray-curable resin protruding from the periphery of the aforesaid functional film while irradiating ultraviolet rays from the front surface of the functional film.

BRIEF DESCRIPTION OF THE DRAWINGS

These and other objects and features of the present invention will become more apparent by the following description of the preferred embodiments made with reference to the attached drawings, wherein.

DESCRIPTION OF THE PREFERRED EMBODIMENTS

Figure 1A:
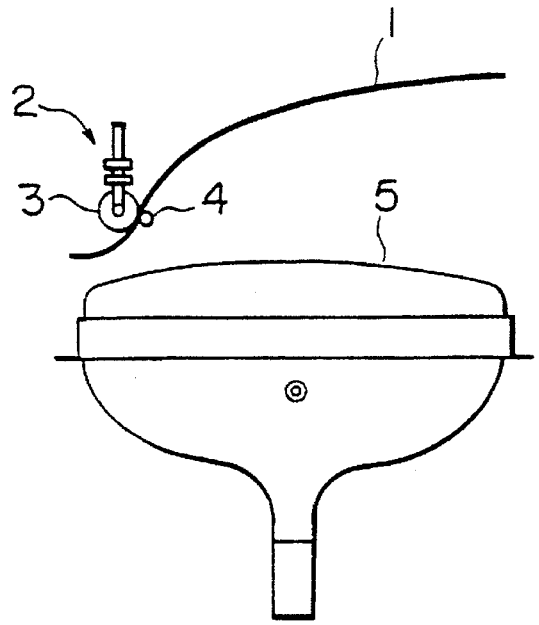
FIGS. 1A to 1C are views showing the steps of the method of adhering a film on a cathode ray-tube in the related art.
Figure 1B:
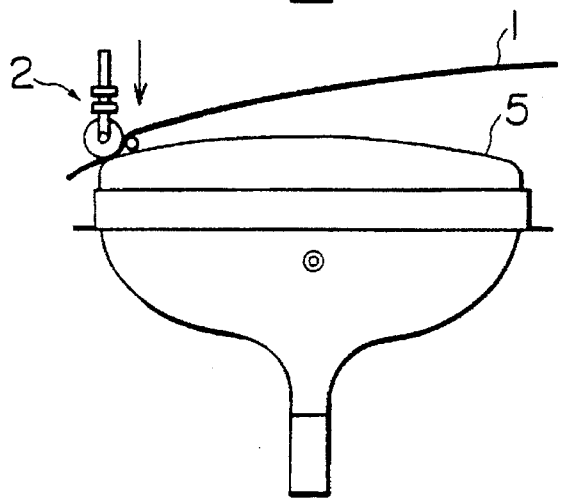
Figure 1C:
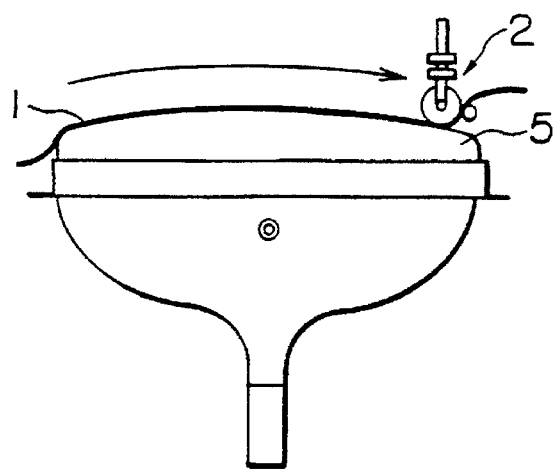

In the present invention, when adhering a film to a surface of a panel of a cathode-ray tube by using an adhesive, the film is brought into tight contact with the panel from the inside of one end portion toward that one end portion, then film is brought into tight contact with the panel toward the other end portion, and therefore the air bubbles in the adhesive resin near one end portion of the panel can be completely pushed out.

Then, thereafter, by bringing the film into tight contact with the panel toward the other end portion, the tight contact between the film and the surface of the panel is created without air bubbles remaining in the resin of the adhesive in the effective screen region of the panel.

In this case, by bringing the film into tight contact with the panel from the vicinity of the outside of the effective screen region toward one end portion of the panel, generation of air bubbles in the effective screen region and generation of streaks by the roller etc. are prevented.

Also, by using an adhesive including an ultraviolet ray-curable resin, it is harder for air bubbles to remain in the resin of the adhesive, the refractive index can be made equivalent to that of the glass of the panel, and therefore the influence of refraction of the light by the adhesive after the curing can be eliminated.

In the present invention, also, when bonding a light transmitting type functional film to the surface of a panel glass, after adhering the light transmitting type functional film to the surface of the panel glass while interposing an ultraviolet ray-curable resin therebetween, the ultraviolet ray-curable resin protruding from the periphery of the aforesaid functional film is heated while irradiating the front surface of the functional film with ultraviolet rays.

preferably the heating temperature applied to the protruding ultraviolet ray-curable resin is within a range of from 50° to 100° C.

Preferably the protruding ultraviolet ray-curable resin is heated by blowing hot air to the aforesaid protruding ultraviolet ray-curable resin. As another method, heating by a heater can be mentioned.

If the heating temperature is over 100° C., the functional film is liable to deteriorate. If a functional film which can withstand at least over 100° C. is developed, hot air having a higher temperature can be used. If it is 50° C. or less, the effect of promoting polymerization is low, and a long time is taken for obtaining the effect which is the object of the present invention.

The time for blowing the hot air is preferably within a range of from 2 seconds to 15 seconds. The blowing time of the hot air is preferably equivalent to the ultraviolet ray irradiation time.

The ambient temperature of the cathode ray-tube subjected to such a treatment is preferably about 25° C.±1° C.

The aforesaid functional film is not particularly restricted, but it can be constituted by for example an acrylic resin, acryl-styrene-based resin, polycarbonate-based resin, polyvinyl chloride-based resin, polyester-based resin, styrene-based resin, urethane-based resin or polyethylene-based resin, polyethylene terephthalate (PET) resin, preferably PET. The heat resistance of the PET is guaranteed up to 120° C. The thickness of such a resin film is generally preferably set to 0.05 to 2.0 mm.

Also, as the aforesaid functional film, also a film comprising a plurality of types of resin films laminated together can be used. Further, it is also possible to use a functional film wherein primer processing is applied to one surface of the film so as to strengthen the bondability to the ultraviolet ray-curable resin, and a hard coating processing for securing the surface hardness, antistatic processing, anti-reflection processing, etc. are applied to the other surface. Such a functional film exhibits functions such as adjustment of light transmittance, prevention of reflection, assistance of strength of the panel glass, prevention of dirtying of the panel glass, or an antistatic function.

The ultraviolet ray-curable resin is not particularly restricted, but can include photo-polymerizable oligomers such as an epoxyacrylate, urethane acrylate, polyester acrylate, polyether acrylate, silicone acrylate, etc.; and photo-polymerizable monomers such as a monofunctional acrylate, polyfunctional acrylate, etc.; and further can contain a photo-initiator such as a benzoin system, acetophenone system, peroxide system, thioxane system, etc.; sensitizing agent such as an amine system, quinone system, etc.; heat polymerization inhibitor, filler, bonding imparting agent, thixo agent, etc. Particularly, from the viewpoints of weather resistance and the bonding strength, a resin containing an urethane acrylate as the photo-polymerizable oligomer, a monofunctional acrylate as the photo-polymerizable monomer, and a benzoin-based initiator as the photo-initiator is preferable.

As the proportions for blending the photo-polymerizable oligomer, photo-polymerizable monomer and the photo-initiator, preferably the photo-polymerizable monomer is contained in an amount of 60 to 150 parts by weight based on 100 parts by weight of the photo-polymerizable oligomer, and the photo-initiator is contained in an amount of 0.05 to 2.0 parts by weight based on 100 parts by weight of the photo-polymerizable oligomer and the photo-polymerizable monomer in total. Further, the viscosity of the ultraviolet ray-curable resin composition is preferably set to 300 to 3000 cps.

Such an ultraviolet ray-curable resin composition is preferably used after adjustment so that the refractive index at the time of curing has a difference from the refractive index of the panel glass within the range of 0.8 percent. That adjustment of the refractive index can be performed by for example incorporating an appropriate amount of styrene monomer to the ultraviolet ray-curable resin composition.

The coating of the ultraviolet ray-curable resin composition adjusted in the refractive index in this way can be carried out by removing air bubbles contained in the ultraviolet ray-curable resin composition in advance of the coating and then using a well known method for example the flow coating method, roll coating method, bar coating method, etc.

An ultraviolet ray-curable resin is promoted in its polymerization effect when it is used in an oxygen-depleted state, but it comes into contact with the oxygen in the air and therefore curing is very difficult. Accordingly, the ultraviolet ray-curable resin protruding from the functional film suffers from the problem of stickiness etc. as in the conventional method.

In the method of the present invention, by applying heat to the ultraviolet ray-curable resin protruding from the functional film, the effect of promotion of polymerization of the ultraviolet ray-curable resin is enhanced and the stickiness of the surface of the ultraviolet ray-curable resin can be eliminated.

The present inventors found that the protruding ultraviolet ray-curable resin could be cured well particularly by blowing hot air. By blowing hot air, also the side effect is exhibited that the surface of the protruding ultraviolet ray-curable resin becomes flat.

Below, the method of adhering a film to a surface of a cathode ray-tube according to the present invention will be explained in detail based on more specific embodiments with reference to the drawings.

First, the overall configuration of the cathode ray-tube will be explained.

Figure 2:
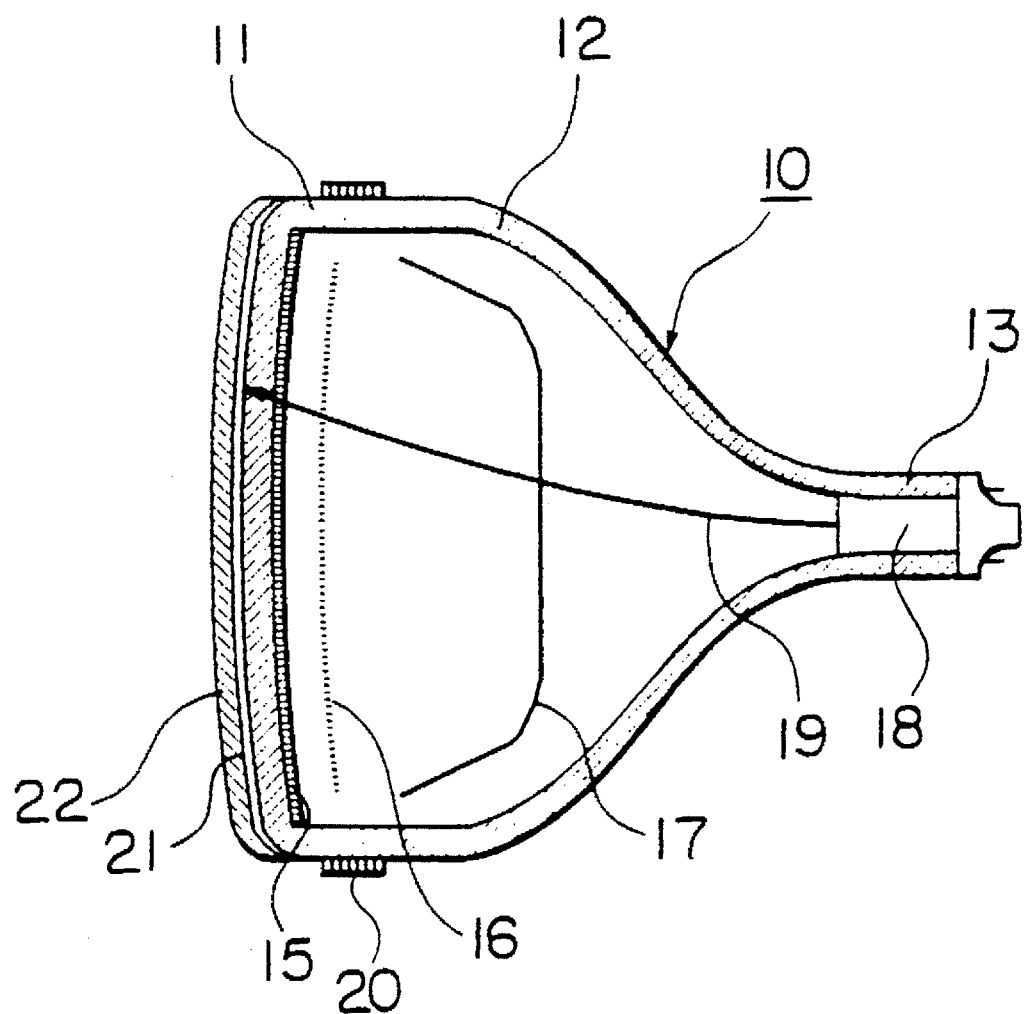
FIG. 2 is a schematic cross-sectional view of a cathode ray-tube according to one embodiment of the present invention.

As shown in FIG. 2, a cathode ray-tube 10 of the present embodiment is comprised of a panel glass 11 and a funnel glass 12 which are melt-fixed by a flit glass portion. A neck portion 13 is formed in a rear end portion of the funnel glass 12.

An RGB phosphor layer 15 is formed on the inner surface of the panel glass 11. An aperture grill 16 is attached to the inside of the panel glass 11 at a predetermined distance from this phosphor layer 15. A magnetic shield 17 is attached behind the aperture grill 16.

An electron gun 18 is attached to the neck portion 13. The electron beam 19 emitted from the electron gun 18 strikes the phosphor layer 15 through the slit of the aperture grill 16 and makes the phosphor layer 15 emit light. An explosion-prevention band 20 attached by shrink-fitting is attached to the outer circumferential surface of the panel glass 11.

A light transmitting type functional film 22 is attached to the front surface of the panel glass 11 via a UV resin layer 21 constituted by an ultraviolet ray-curable resin. In the present embodiment, the refractive index of the UV resin layer 21 is adjusted to give a difference from the refractive index of the panel glass 11 of within a range of 0.8 percent. Therefore, as the panel glass 11, it is also possible to use a panel glass which is not precisely polished but has unevenness of about 300 μm on the surface. Also, by adjusting the light transmittance of the functional film 22, a cathode ray-tube having a stable quality can be produced without regard to the material of the panel glass 11.

Here, an example of the method of producing a cathode ray-tube involving the method of adhering a film according to a first embodiment of the present invention will be explained.

Figure 3A:
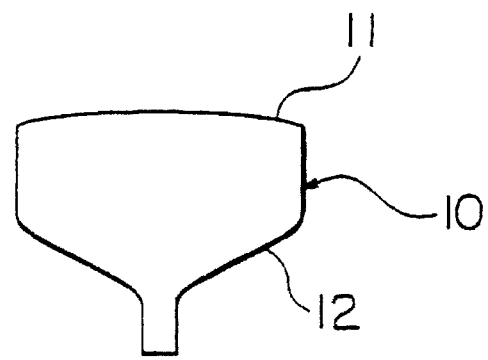
FIGS. 3A to 3D are schematic views showing the manufacturing process of the cathode ray-tube shown in FIG. 2 according to an embodiment of the present invention.

As shown in FIG. 3A, as the panel glass 11, one not subjected to outer surface polishing is prepared. A fluorescent surface is formed on the inner surface of this panel glass 11, the aperture grill is attached and then is bonded to the funnel glass 12, and thereby a cathode ray-tube 10 equipped with an explosion-preventing band is produced. Next, the surface of the panel glass 11 of the cathode ray-tube is successively cleaned by a cleaning solution, pure water, and an alcohol-based solvent and then dried.

Figure 3B:
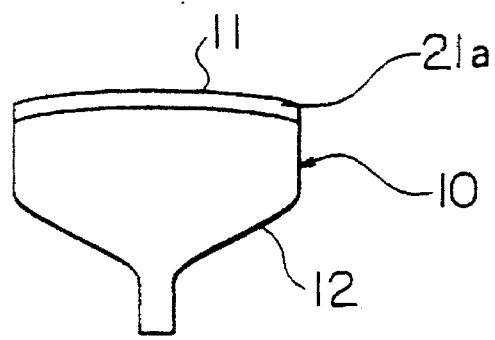

Next, as shown in FIG. 3B, an ultraviolet ray-curable resin composition 21a is coated on the surface of the panel glass 11. As this ultraviolet ray-curable resin composition 21a, use is made of one adjusted so that the refractive index of the cured substance has a difference from the refractive index of the panel glass of within a range of 0.8 percent.

In the present embodiment, as the ultraviolet ray-curable resin composition, use is made of a composition containing 10 percent by weight of a bisphenol A type epoxy (meth) acrylate having a molecular weight of 550 or more, 20 percent by weight of a urethane (meth)acrylate, 70 percent by weight of a hydroxyl group-containing mono(meth) acrylate, 3 percent of a photo-polymerization initiator and a few percent of additives.

The ultraviolet ray-curable resin composition 21a can be coated by removing air bubbles contained in the ultraviolet ray-curable resin composition in advance of the coating and using a well known method for example the flow coating method, roll coating method, bar coating method, etc.

Figure 3C:
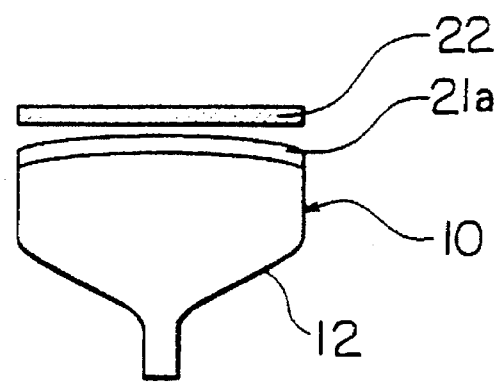
Figure 3D:
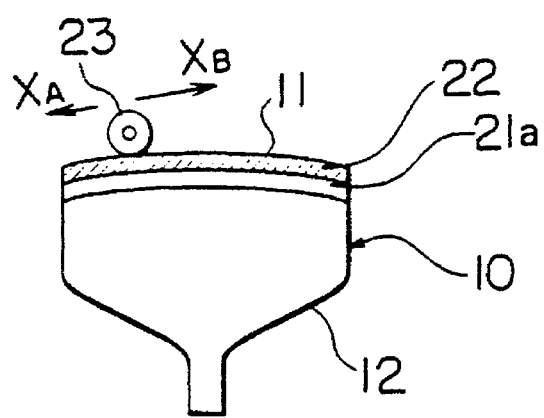

Next, as shown in FIG. 3C, a functional film 22 cut into a piece having a shape matching the front surface of the panel glass 11 is attached to the surface coated by the ultraviolet ray-curable resin composition 21a. As the functional film 22, a PET film is used in the present embodiment. Thereafter, as shown in FIG. 3D, the functional film 22 is pushed against the surface of the panel glass 1 using a pressing roll 13 etc. from a location at the inside of the end to the direction $X_A$ of that end, then is pushed to the other end, that is, $X_B$, to make the thickness of the ultraviolet ray-curable resin composition 21a uniform and prevent folds or wrinkles from appearing on the surface. The thickness of the ultraviolet ray-curable resin composition 21a is preferably about 0.05 to 2.5 mm. As the pressing roll 23, a metal roll, a hard rubber roll, a rubber-lining metal roll, etc. can be used. Note that the descending position of the pressing roll 23 to the panel glass 11 is the same as the position shown in the later mentioned FIG. 6.

Next, an explanation will be made of a second embodiment of the present invention.

Figure 4:
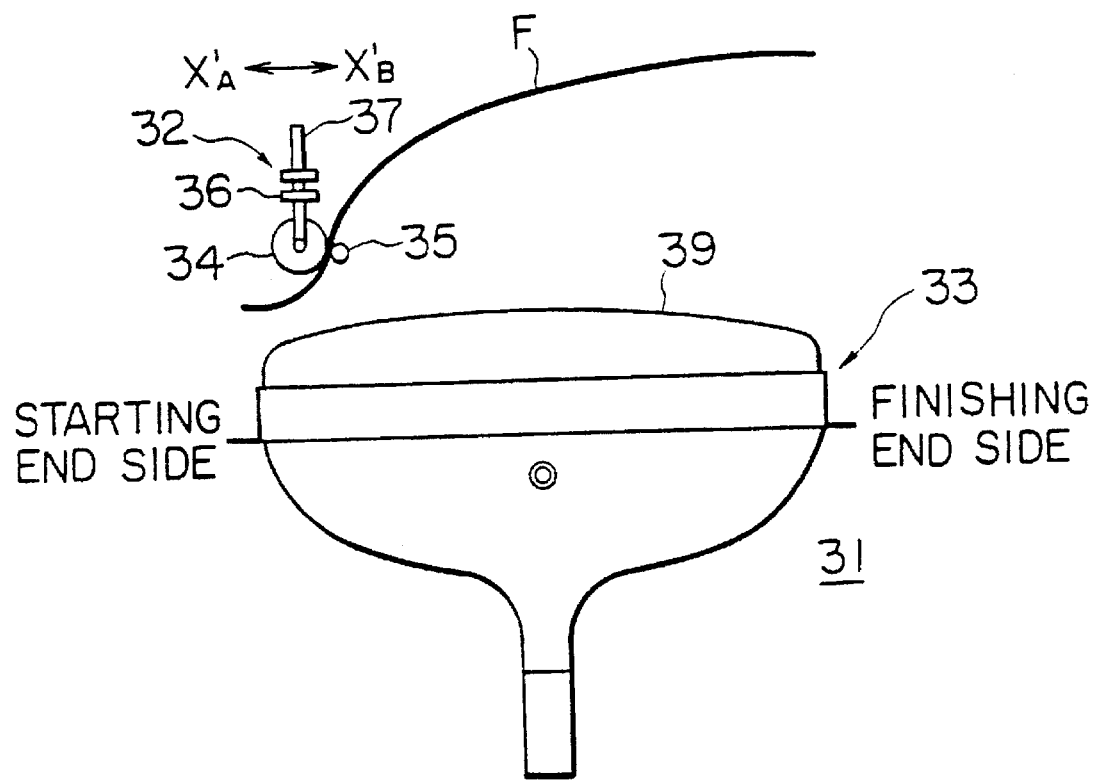
FIG. 4 is a front view showing a cathode-ray tube to which the present invention is applied and an adhesion roller for executing the present invention.

FIG. 4 shows a cathode-ray tube 31 to which the present invention is applied and an adhesion roller 32 for executing the present invention.

The method of the present embodiment calls for adhering the film 38 to the surface of the panel 39 of the cathode-ray tube 31 after assembly.

As shown in FIG. 4, in the present embodiment, the envelope 33 of the cathode-ray tube 31 is fixed in place with the surface of the panel 39 facing upward.

Above the envelope 33, the adhesion roller 32 for adhering the film 38 to the surface of the panel 39 is provided.

This adhesion roller 32 has an adhesion head 36. To the adhesion head 36, a roller 34 made of for example a neoprene rubber and a feed roller 35 for sandwiching the film 38 with this roller 34 and holding it are attached. The adhesion head 36 is provided with a pressing cylinder 37 for pressing the roller 34 to apply a constant pressure to the top of the film 38 and thereby perform the adhesion. Further, the adhesion roller 32 is attached to a mechanism (not illustrated) for vertical movement and for movement in a direction $X'_A$ or $X'_B$.

Next, an embodiment of the method of adhering a film to a surface of a panel of a cathode-ray tube according to the present invention will be explained by referring to FIG. 4 and FIGS. 5A to 5C.

First, the envelope 33 of the cathode-ray tube 31 which has finished being assembled is fixed in place with the panel 39 facing upward. An ultraviolet ray-curable resin (for example an acrylate-based radical polymerized ultraviolet ray-curable resin) is coated on the surface of the panel 39.

Figure 5A:
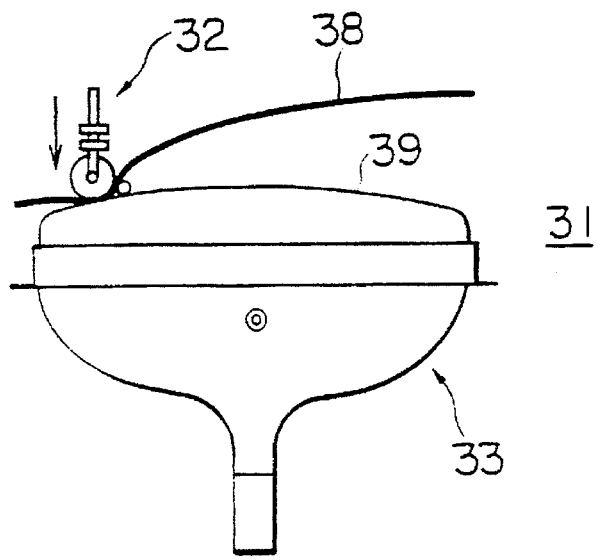
FIGS. 5A to 5C are explanatory views showing steps of a film adhering method using a roller according to a second embodiment of the present invention.
Figure 5B:
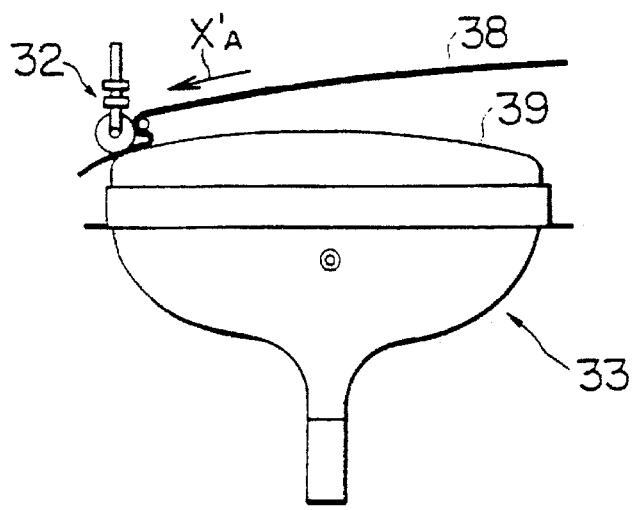
Figure 5C:
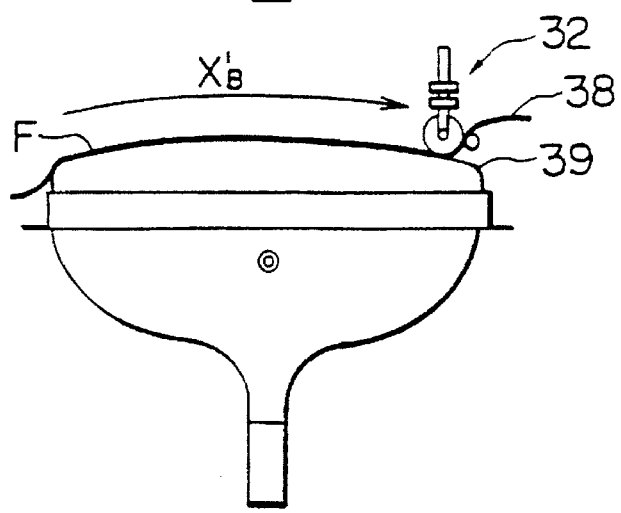

Then, as shown in FIGS. 5A to 5C, the film 38 is sandwiched between the roller 34 and the feed roller 35, and the adhesion roller 32 is arranged above one end (starting end) side of the panel 39.

Next, as shown in FIG. 5A, the adhesion roller 32 is moved downward and the film 38 is pushed against the surface of the panel 39.

Figure 6:
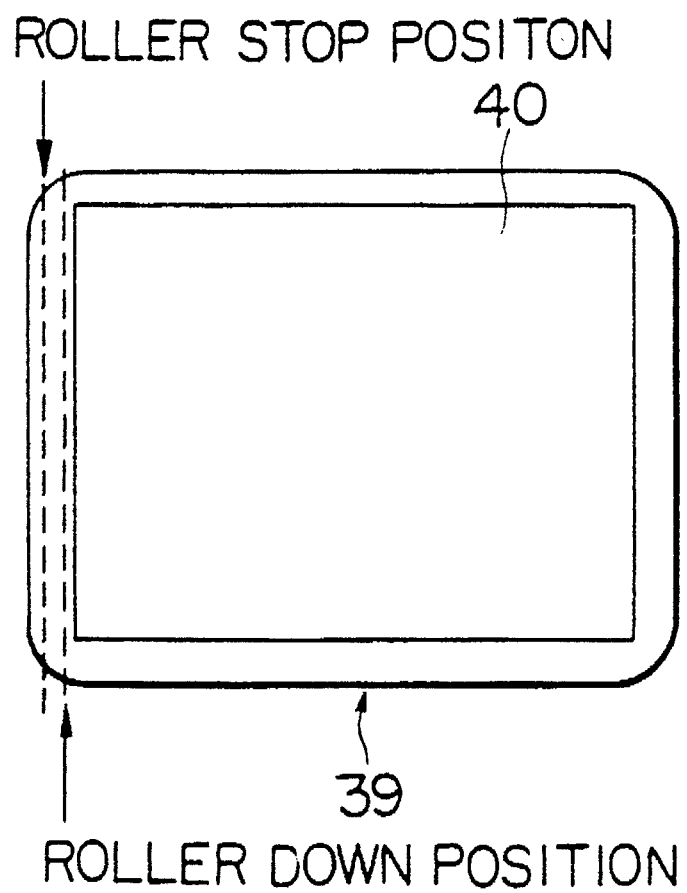
FIG. 6 is an explanatory view showing a downward movement position and stopping position of the roller on the panel in the second embodiment.

In this case, as shown in FIG. 6, unlike the case of the conventional method, the adhesion roller 32 is moved downward at a portion inside the starting end of the panel 39 near the outside of the effective screen region 408 (for example a position 2 to 3 mm apart from the effective screen region 40 in a 25-inch cathode-ray tube).

Then, as shown in FIG. 5B, the adhesion roller 32 is moved in this state to the starting end side, that is, in the direction indicated by an arrow $X'_A$, for a predetermined distance (for example about 5 mm in for example a 25-inch cathode-ray tube) so the film 38 is brought into tight contact with the portion at the starting end side of the panel 39 and will not peel off.

In this case, as shown in FIG. 6, the adhesion roller 32 is stopped slightly before the end portion of the starting end side of the panel. The air bubbles in the adhesive resin near the starting end are pushed to the outside by this. Note that, the end portion of the film 38 is fixed by a not illustrated film holder.

Further, as shown in FIG. 5C, the adhesion roller 32 is moved to the terminal end side, that is, in the direction indicated by an arrow $X'_B$, along the surface of the panel 39.

Note that, the pressure applied from the roller 34 to the surface of the panel 39 is preferably one by which a load of about 3 to 5 kg is applied on the entire roller 34. It is also possible to change the pressure in accordance with the type or size of the envelope 33.

Thereafter, the film 38 is detached from the adhesion roller 32 and ultraviolet rays are irradiated to cure the adhesive, whereby the film 38 is bonded to the surface of the panel 39.

As mentioned above, according to the method of the present embodiment, the film 38 is pushed against the surface of the panel 39 at the inside of the starting end of the surface of the panel 39, the adhesion roller 32 is moved in this state toward the starting end to achieve tight adhesion of the film 38, and then the adhesion roller 32 is moved to the terminal end side to achieve tight adhesion of the film 38 to the entire surface of the panel 39, whereby the air bubbles in the adhesive near the starting end can be pushed out to the starting end side. As a result, it becomes possible to completely push out the air bubbles, which can become the cause of the glitter in the effective screen region 40, from the resin of the adhesive.

Note that the present invention is not restricted to the above-mentioned embodiment and that various modifications are possible.

For example, the position which the adhesion roller is moved downward to can be changed in accordance with the type or size of the envelope.

Moreover, also the means of bringing the film into tight contact with the surface of the panel is not restricted to a roller. Various means can be used. Note that the use of a roller of the structure used in the above-mentioned embodiment is the most effective.

Further, also the adhesive for adhering the film to the surface of the panel is not restricted to an ultraviolet ray-curable one. It is also possible to use another electron beam-curable adhesive, and it is also possible to use an adhesive which is not electron beam-curable (thermosetting resin, pressure-sensitive adhesive, etc.)

As mentioned above, according to the present invention, when adhering a film to a surface of a panel of a cathode-ray tube by using an adhesive, the film is brought into tight contact with the panel from the inside of one end portion toward that one end portion, then film is brought into tight contact with the panel toward the other end portion, and therefore the air bubbles in the adhesive resin near one end portion of the panel can be completely pushed out, and as a result, glitter in the effective screen region can be prevented.

In this case, by bringing the film into tight contact with the panel from the vicinity of the outside of the effective screen region toward one end portion of the panel, the glitter in the effective screen can be further prevented.

Further, by using an ultraviolet ray-curable adhesive, the glitter in the effective screen region can be completely prevented and optical deterioration due to the adhesive can be prevented.

Next, an explanation will be made of a third embodiment of the present invention.

Figure 7:
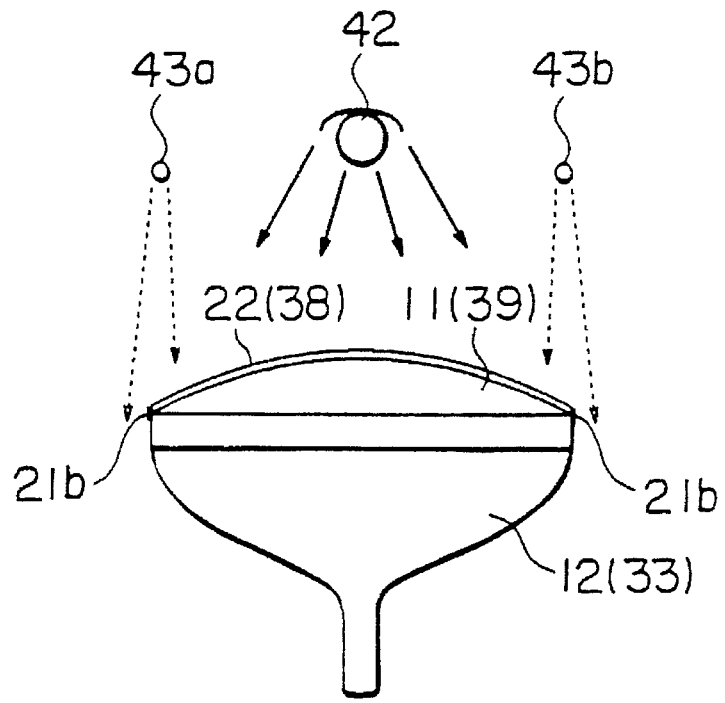
FIG. 7 is a schematic view showing the manufacturing process subsequent to the manufacturing process shown in FIG. 3D or FIG. 5D in a third embodiment of the present invention.

As shown in FIG. 7, ultraviolet rays are irradiated from the top of the functional films 22, 38 by using an irradiation light source 42 to cure the ultraviolet ray-curable resin composition 21a shown in FIG. 3B. As the irradiation light source 42, use can be made of a metal halide lamp, high pressure mercury lamp, xenon lamp, etc. As the irradiation energy, about 300 to 500 mJ/cm$^2$ is suitable.

Figure 8:
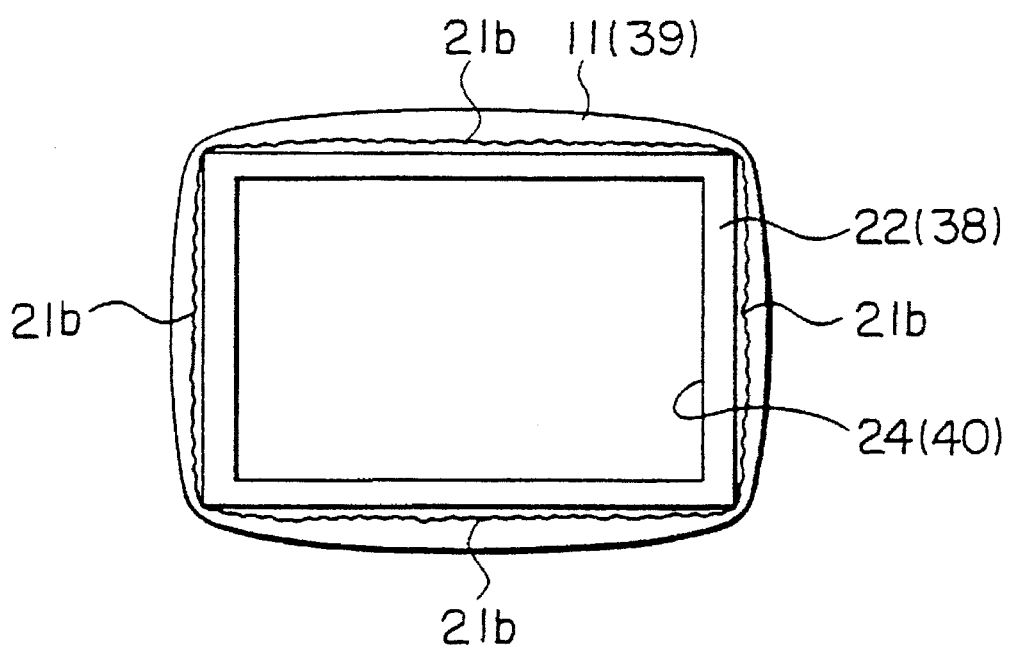
FIG. 8 is a panel side front view of the cathode ray-tube in the state shown in FIG. 7.

At the same time as the irradiation of the ultraviolet rays, in the present embodiment, as shown in FIG. 7, hot air is blown toward the protruding part 21b (refer to FIG. 8) of the ultraviolet ray-curable resin composition produced in the coating step of the functional films 22, 28 by using the hot air sources 43a, 43b. Note that, in FIGS. 6 and 8, reference numeral 24 (40) indicates the range of the effective screen.

The temperature of the hot air is within a range of from 50° to 100° C. By blowing the hot air in such a temperature range, the effect of promotion of polymerization of the ultraviolet ray-curable resin composition is enhanced, and the stickiness of the surface of the ultraviolet ray-curable resin at the protruding portion 21b can be eliminated. Also, by blowing the hot air, the surface of the ultraviolet ray-curable resin at the protruding portion 21b becomes flat, and therefore when attaching the cathode ray-tube to the television set (escutchen), there is no interference with the other parts, which is convenient.

Figure 9:
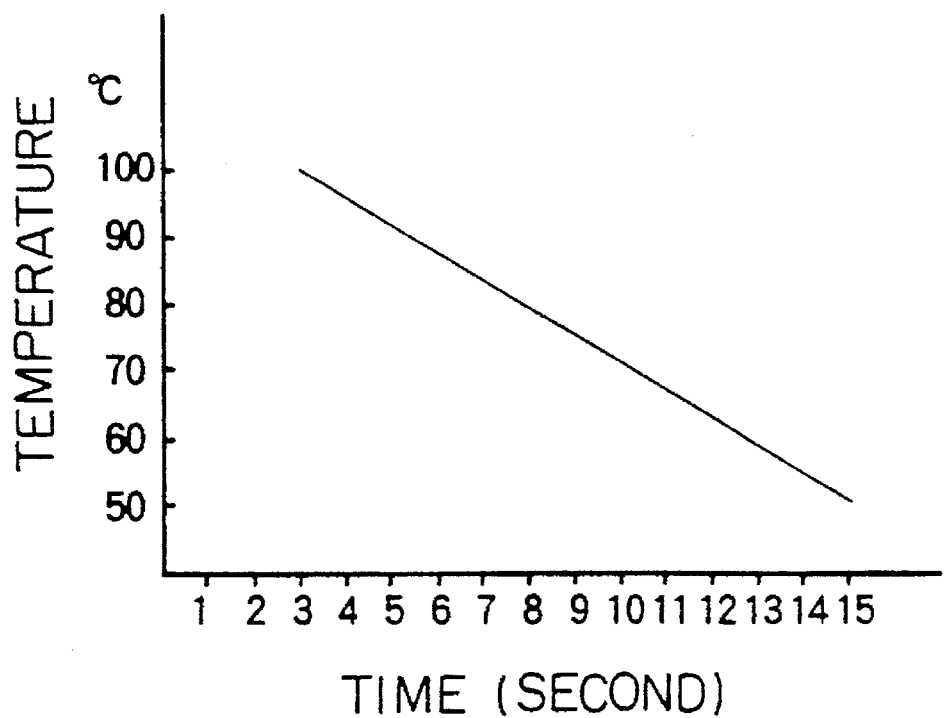
FIG. 9 is a graph showing the relationship between the temperature of the hot air and the hot air treatment time.

The relationship between the temperature of the hot air and the time until the ultraviolet ray-curable resin is cured is shown in FIG. 9. As shown in FIG. 9, the higher the temperature of the hot air, the shorter time in which the curing is carried out (2.3 seconds at a wind speed of 100 m/min and a temperature of 100° C.), but a PET film can crumple when the temperature becomes 120° C. or more, and therefore the temperature is preferably 100° C. or less. Note that, when it is 50° C. or less, the effect or promoting the polymerization reaction is low. The blowing time of the hot air is 2 to 15 seconds, preferably 10 to 15 seconds, in accordance with the irradiation time of ultraviolet rays.

Note that, the present invention is not restricted to the above-mentioned embodiments and can be modified in various ways within the scope of the present invention.

For example, in the aforesaid embodiments, the ultraviolet ray-curable resin at the protruding portion 11b was cured by using hot air, but in the present invention, it is also possible to heat the ultraviolet ray-curable resin of the protruding portion 21b by a heater or the like without the use of the hot air.

As explained above, according to the present invention, the effect of promotion of polymerization of the ultraviolet rays is enhanced by applying heat to the ultraviolet ray-curable resin protruding from the functional film, and the stickiness of the surface of the ultraviolet ray-curable resin can be eliminated. Particularly, by blowing hot air, there is also a side-effect that the surface of the protruding ultraviolet ray-curable resin becomes flat.

Since the stickiness of the protruding ultraviolet ray-curable resin is eliminated, trimming becomes unnecessary, and also the necessity of adhering tape or the like on top of the protruding ultraviolet ray-curable resin is eliminated. As a result, the steps for adhering tape or the steps for the trimming can be reduced. Accordingly, mass production becomes possible, and the manufacturing yield is improved. Also, the necessity of providing extra space for adhering the tape is eliminated.

Also, in the present invention, heat treatment such as hot air treatment is carried out at the same time as the irradiation of the ultraviolet rays, and therefore the number of manufacturing steps is not increased.

What is claimed is:

1. A method of adhering a film to a substantially front facing surface of a cathode-ray tube comprising the steps of:
   adhering the film to the surface of said cathode-ray tube by using an adhesive;
   pressing said film to said light transmitting cathode ray tube starting from a position located at a distance inward from one lateral end of said surface, and pressing across said surface to said one end across said distance, and then reversing direction of said pressing and pressing from said one end to a respective opposite lateral end across said surface.

2. A method of adhering a film to a surface of a cathode-ray tube as set forth in claim 1, wherein said position is located laterally on an outside of an effective screen region of said surface.

3. A method of adhering a film to a surface of a cathode-ray tube as set forth in claim 1, wherein said adhesive includes an ultraviolet ray-curable resin.

4. A method of adhering a film to a surface of a cathode-ray tube which bonds a light transmitting functional film to a surface of a panel glass, including the steps of:
   forming a layer of an ultraviolet ray-curable resin on said surface of said panel glass;
   adhering a light transmitting functional film to the ultraviolet ray-curable resin;
   providing that said ultraviolet ray-curable resin is arranged to protrude from the periphery of said functional film; and
   heating said ultraviolet ray-curable resin protruding from the periphery of said functional film while irradiating ultraviolet rays from a front surface of said functional film.

5. A method of adhering a film to a surface of a cathode-ray tube as set forth in claim 4, wherein a heating temperature applied to said protruding ultraviolet ray-curable resin is within a range of from 50° to 100° C.

6. A method of adhering a film to a surface of a cathode-ray tube as set forth in claim 4, wherein said protruding ultraviolet ray-curable resin is heated by blowing hot air to said protruding ultraviolet ray-curable resin.

7. A method of adhering a film to a surface of a cathode-ray tube as set forth in claim 6, wherein a time of blowing said hot air is within a range of from 2 seconds to 15 seconds.

8. A method of adhering a film to a surface of a cathode-ray tube which bonds a light transmitting transparent functional film to the surface of a panel glass, including the steps of:
   forming a layer of an ultraviolet ray-curable resin on said surface of said panel glass;
   pressing said film to said surface starting from a position located at a distance inwardly from one lateral end of said surface, and pressing across said surface to said one end, and then reversing direction of said pressing and pressing from said one end to a respective opposite lateral end across said surface;
   providing that said ultraviolet ray-curable resin is arranged to protrude from the periphery of said functional film and
   heating said ultraviolet ray-curable resin protruding from the periphery of said functional film while irradiating ultraviolet rays from said front surface of said functional film.

9. A method of adhering a film to a surface of a cathode-ray tube as set forth in claim 8, wherein said heating temperature applied to said protruding ultraviolet ray-curable resin is within a range of from 50° to 100° C.

10. A method of adhering a film to a surface of a cathode-ray tube as set forth in claim 8, wherein said protruding ultraviolet ray-curable resin is heated by blowing hot air to said protruding ultraviolet ray-curable resin.

11. A method of adhering a film to a surface of a cathode-ray tube as set forth in claim 10, wherein a time of blowing said hot air is within a range of from 2 seconds to 15 seconds.

* * * * *